(12) United States Patent
Bindewald et al.

(10) Patent No.: US 7,778,965 B2
(45) Date of Patent: Aug. 17, 2010

(54) SYSTEMS AND METHODS FOR COMMON INSTANCE HANDLING OF PROVIDERS IN A PLURALITY OF FRAMEWORKS

(75) Inventors: Jutta Bindewald, Angelbachtal (DE); Frank Brunswig, Heidelberg (DE); Uwe Schlarb, Ostringen (DE); Volker Wiechers, Heidelberg (DE)

(73) Assignee: SAP AG, Walldorf (DE)

( * ) Notice: Subject to any disclaimer, the term of this patent is extended or adjusted under 35 U.S.C. 154(b) by 866 days.

(21) Appl. No.: 11/438,356

(22) Filed: May 23, 2006

(65) Prior Publication Data
US 2007/0285993 A1  Dec. 13, 2007

(51) Int. Cl.
G06F 7/00 (2006.01)
G06F 17/00 (2006.01)
(52) U.S. Cl. .................. 707/610; 707/999.201
(58) Field of Classification Search ............ 707/201, 707/610, 999.201
See application file for complete search history.

(56) References Cited

U.S. PATENT DOCUMENTS

| | | | | |
|---|---|---|---|---|
| 6,029,178 A * | 2/2000 | Martin et al. | | 707/201 |
| 6,859,821 B1 * | 2/2005 | Ozzie et al. | | 709/205 |
| 2004/0143606 A1 * | 7/2004 | Pauly et al. | | 707/200 |
| 2004/0267834 A1 * | 12/2004 | Sasaki et al. | | 707/201 |
| 2005/0027755 A1 * | 2/2005 | Shah et al. | | 707/201 |
| 2005/0108298 A1 * | 5/2005 | Iyengar et al. | | 707/201 |
| 2006/0047709 A1 * | 3/2006 | Belin et al. | | 707/201 |
| 2006/0112011 A1 * | 5/2006 | Al-Ali | | 705/42 |
| 2006/0271600 A1 * | 11/2006 | Goh et al. | | 707/201 |
| 2007/0239797 A1 * | 10/2007 | Cattell et al. | | 707/201 |

\* cited by examiner

Primary Examiner—Jean M Corrielus
Assistant Examiner—Joshua Bullock
(74) Attorney, Agent, or Firm—Mint, Levin, Cohn, Ferris, Glovsky & Popeo, P.C.

(57) ABSTRACT

Systems and methods are provided for handling instances of providers in a plurality of frameworks. An instance of a first provider is created and registered to store a first change to a buffer. An instance of a second provider is created and registered to store a second change to the buffer. The buffer is checked to determine whether data consistency is guaranteed to result from the first and second changes. If data consistency is guaranteed, the first and second changes are committed to a database.

20 Claims, 4 Drawing Sheets

SYSTEMS AND METHODS FOR COMMON INSTANCE HANDLING OF PROVIDERS IN A PLURALITY OF FRAMEWORKS

BACKGROUND

I. Technical Field

The present invention relates generally to data processing and, more particularly, to common handling of instances of providers called from a plurality of frameworks.

II. Background Information

In an enterprise services architecture (ESA), a client may call providers at a plurality of frameworks to perform transactions on business objects. A framework is a system of software on one or more interconnected computers or processors that implements transactions. For example, the providers may include service providers, service managers, and proxies. The transactions may be called or performed via the Internet or an intranet. Typically, the providers use a standardized messaging, such as XML (Extensible Markup Language) and SOAP. Moreover, there is usually some type of web mechanism, such as UDDI (or Universal Description, Discovery, and Integration) to locate the service (and its public Application Program Interface (API)).

A client can call the individual providers from a framework through an API. An example of such a framework is an "enterprise services framework" (ESF). In response to the call, the framework instantiates the provider to operate on one or more business objects in a database. As used herein, the term "instantiate" means, in an object oriented programming (OOP) environment, to initialize an instance of an object of a particular class, and, more generally, includes deploying, customizing, running and/or executing an application. As used herein, an "object" means a software bundle of methods and related variables (e.g., data). For example, in object-oriented programming, an object is a concrete realization (i.e., "instance") of a class that consists of operations and the data associated with those operations. The term "business object" refers to a software bundle of variables and related methods that can be used for describing a business process or task. The business object may be implemented and stored as a data structure. The API, when called, instantiates providers, such as a catalog service provider for listing products from a catalog or a purchasing service provider for allowing the purchase of a product.

However, when a client calls multiple providers to operate on related business objects, interference between the providers at runtime can result in relation to those business objects. For example, the interference may result in inconsistencies in the data contained in the business objects, which may cause further data corruption, misreading of the present states of the business objects, or other errors. Furthermore, the inconsistencies resulting from interference between the multiple providers may be difficult to manage. For example, it may not be possible to undo the inconsistencies in the database. This may cause stalling of the providers or propagation of inconsistencies through the database.

Thus, it is desirable to prevent inconsistencies resulting from the transactions. It is further desirable to manage inconsistencies that result from the transactions.

SUMMARY

Consistent with embodiments of the invention, systems and methods are provided for adapting procedure calls to service providers of a computer framework. Embodiments of the invention include systems and methods, as well as computer program products comprising computer-readable program code that perform methods consistent with the invention when implemented by a computer or processor.

In accordance with one embodiment, a method is provided of handling instances of providers in a plurality of frameworks. The method comprises creating and registering an instance of a first provider to store a first change to a buffer. An instance of a second provider is created and registered to store a second change to the buffer. The buffer is checked to determine whether data consistency is guaranteed to result from the first and second changes. The first and second changes are committed to a database when data consistency is guaranteed.

In accordance with another embodiment, a common instance handler is provided for handling instances of providers in a plurality of frameworks. The common instance handler includes a processor and a memory, wherein the processor and the memory are configured to perform a method. The method includes registering an instance of a first provider to store a first change to a buffer, and registering an instance of a second provider to store a second change to the buffer. The method also includes checking the buffer to determine whether data consistency is guaranteed to result from the first and second changes. The method further includes committing the first and second changes to a database when data consistency is guaranteed.

In accordance with yet another embodiment, a computer program product is provided for handling instances of providers in a plurality of frameworks. The computer program product comprises a computer-readable storage medium having computer-readable program code stored therein. The computer-readable program code is executable by a processor and comprises a register instruction set executable to register an instance of a first provider to store a first change to a buffer, and an instance of a second provider to store a second change to the buffer. A check instruction set is executable to check the buffer to determine whether data consistency is guaranteed to result from the first and second changes. A commit instruction set is executable to commit the first and second changes to a database when data consistency is guaranteed.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments consistent with the present invention may be directed to various combinations and sub-combinations of the features described in the following detailed description.

BRIEF DESCRIPTION OF THE DRAWINGS

The accompanying drawings, which are incorporated in and constitute a part of this specification, show certain aspects of implementations consistent with the present invention and, together with the description, serve to explain the principles of the invention. In the drawings.

DESCRIPTION OF THE EMBODIMENTS

Figure 1:
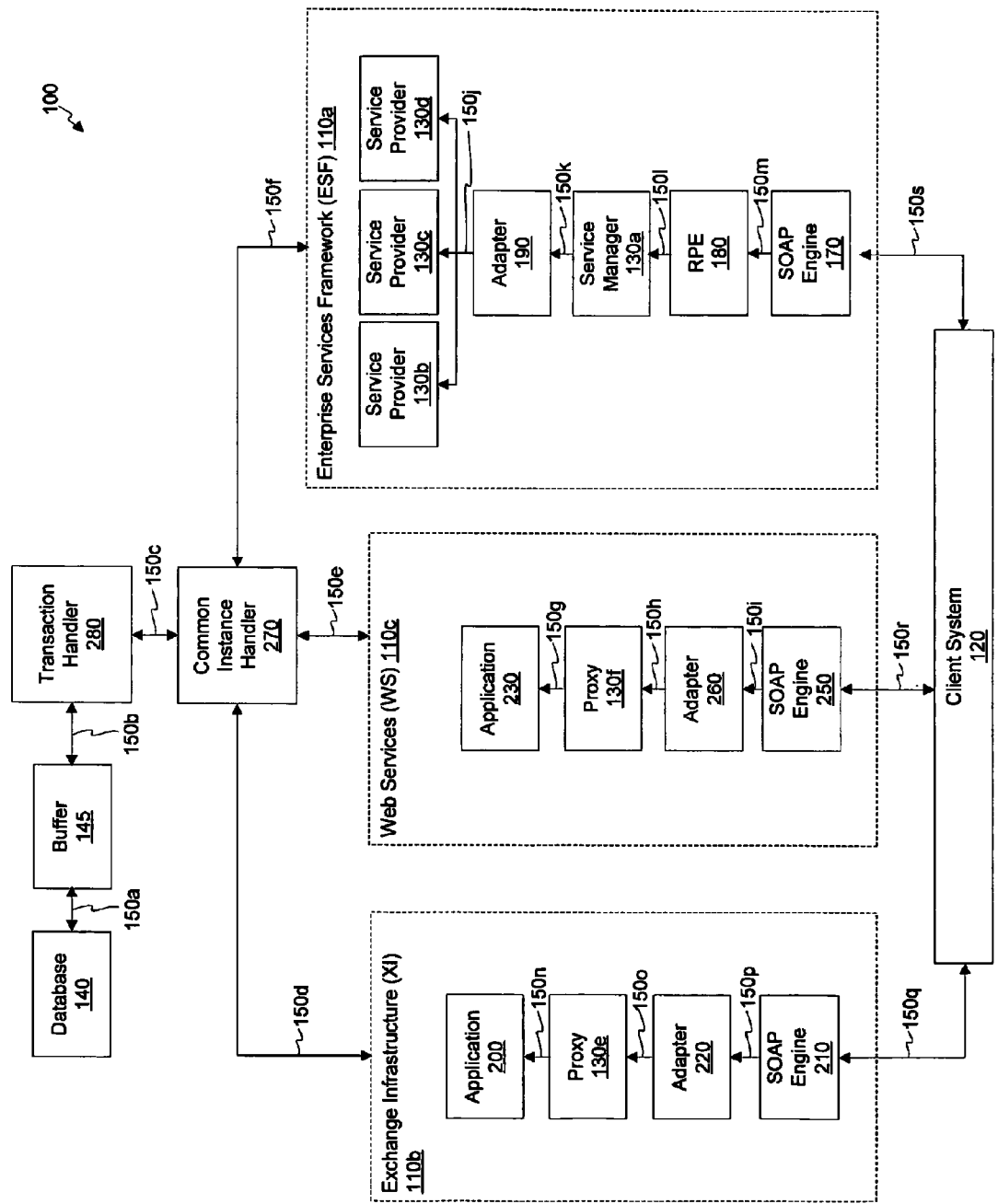
FIG. 1 is a block diagram of an exemplary environment, consistent with certain aspects of the present invention, of a system environment that includes a plurality of frameworks, each of the frameworks having at least one provider, and a common instance handler to manage instances of the providers.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 is a block diagram of an exemplary embodiment, consistent with aspects of the present invention, of a system environment 100 that includes a plurality of frameworks 110a-110c and a client system 120. A framework is a system having one or more processors and one or more memories that can execute computer-readable program code to make classes of transactions accessible to a client system or other frameworks. The frameworks 110a-110c may individually have providers 130a-130f. Providers 130a-130f start the transactions, in response to requests from a client system or framework, to operate on a plurality of business objects in a database 140 via a buffer 145, such as to create, modify, read, or delete data in database 140 via buffer 145. Providers 130a-130f may include or be associated with service managers (such as service manager 130a), service providers (such as service providers 130b-130d), and proxies (such as proxy 130e and proxy 130f). Frameworks 110a-110c may be constructed using tools provided by SAP Netweaver™ (commercially available from SAP AG, Walldorf, Germany). Frameworks 110a-110c may include one or more processors, such as embodied in computers, to communicate with other computers, such as client system 120. Although FIG. 1 is described with respect to frameworks 110a-110c, system environment 100 can use any other suitable frameworks.

System environment 100 has data connections 150a-150s within and among the frameworks 110a-110c. Data connections 150a-150s may include, alone or in any suitable combination, a telephony-based network, a local area network (LAN), a wide area network (WAN), a dedicated intranet, wireless LAN, the Internet, an intranet, a wireless network, a bus, or any other electronic communication mechanisms. Further, any suitable combination of wired and/or wireless components and systems may constitute data connections 150a-150s. Moreover, data connections 150a-150s may be implemented using bi-directional, unidirectional, or dedicated communication links. Data connections 150a-150s may use standard transmission protocols, such as Transmission Control Protocol/Internet Protocol (TCP/IP), Hyper Text Transfer Protocol (HTTP), SOAP, Remote Procedure Call (RPC), or other protocols.

Frameworks 110a-110c may include an enterprise services framework (ESF), such as ESF 110a shown in FIG. 1. ESF 110a implements a type of services architecture that includes service providers 130b-130d. A service provider is an application, such as a web service, that responds to requests from a client system. Service providers 130b-130d are managed by service manager 130a, making service providers 130b-130d accessible to other parts of system environment 100. A simple object access protocol (SOAP) engine 170 may be provided to transmit and/or receive SOAP messages. ESF 110a may also include a remote processing engine (RPE) 180 to adapt communications with SOAP engine 170.

An adapter 190 may be provided between service manager 130a and service providers 130b-130d and their corresponding business objects. Adapter 190 implements or includes an API that can be used to intercept inbound procedure calls from service manager 130a, and adapt the inbound procedure calls to outbound procedure calls to service providers 130b-130d, such that the outbound procedure calls are compatible with service providers 130b-130d. Data connections 150j are provided between adapter 190 and service providers 130b-130d, and data connections 150k are provided between service manager 130a and adapter 190.

Frameworks 110a-110c may also include an exchange infrastructure (XI) framework, such as XI framework 110b. XI framework 110b includes an application 200 that provides a service to components outside of XI framework 110b via agents that are instantiated by proxy 130e. A SOAP engine 210 can be provided to transmit and/or receive SOAP messages. An adapter 220 may be provided to communicate between proxy 130b and SOAP engine 210.

Frameworks 110a-110c may further include a web services (WS) framework, such as WS framework 110c. WS framework 110c also includes an application 230 that provides a service to components outside of WS framework 110c via agents that are instantiated by proxy 130f. A SOAP engine 250 can be provided to transmit and/or receive SOAP messages. An adapter 260 may be provided to communicate between proxy 130c and SOAP engine 250.

Client system 120 can call transactions from any of providers 130a-130f in frameworks 110a-110c. Client system 120 may include a user interface (UI) and a generic client proxy (GCP). Client system 120 can communicate with frameworks 110a-110c through data connections 150q-150s. Client system 120 may include one or more processors, which may be implemented in computers, to communicate with frameworks 110a-110c. The user interface provides an interface to allow a user to interact with providers 130a-130f. For example, the user interface may include a browser to provide a user content from providers 130a-130f. In some implementations, SAP Web Dynpro (commercially available from SAP AG, Walldorf, Germany) is used as a model-based development environment for generating the user interface, although other development environments can also be used.

In an exemplary embodiment, client system 120 calls the API of service manager 130a. When the API of service manager 130a is called, service manager 130a is instantiated. The instance of service manager 130a may include a message handler for handling messages to and from service providers 130b-130d; a change handler for handling changes affecting service providers 130b-130d (e.g., changes that occur when the user interface changes, such as a button click, that affect a service provider or corresponding business objects); a controller for controlling dynamic properties of the instance (e.g., read-only, changeable, invisible, and the like); and a stack for storing changes associated with the change handler in a last in, first out (LIFO) manner. For example, when a user wishes to modify a business object, a dynamic property of the business object can be switched from "read-only" to "changeable." In another example, a dynamic property is an association between two or more business objects, such as an association between a purchase order and a published purchase order. In this example, when the purchase order acquires a status of "published," the service provider implementation sets the a dynamic property that enables the association between the purchase order and the published purchase order.

Moreover, when the API of service manager 130a is called, service manager 130a may communicate with service providers 130b-130d, such as through an API of service providers 130b-130d, to instantiate one or more of service providers 130b-130d. When one of service providers 130b-130d is instantiated by service manager 130a, that service provider may also instantiate a corresponding business object. For example, a user of the user interface may access one of service providers 130b-130d to interact with a product catalog. The data and methods associated with providing the product catalog to the user interface correspond to a business object.

A common instance handler (CIH) 270 is provided to centrally handle instances of providers 130a-130f of frameworks 110a-110c. For example, CIH 270 may instantiate a transaction handler to coordinate the transactions performed by the provider instances, such as instances of service manager 130a and proxies 130e-130f, as part of a logical unit of work (LUW). CIH 270 need not be instantiated. The LUW includes a sequence of changes to BOs, the changes being written to database 140 after consistency checks have been performed in buffer 145. The LUW may also be referred to as a "bracket" or "roll area." For example, a LUW may correspond to a series of changes to database 140. In one exemplary embodiment, CIH 270 is implemented as a component of ESF 110a.

Figure 2:
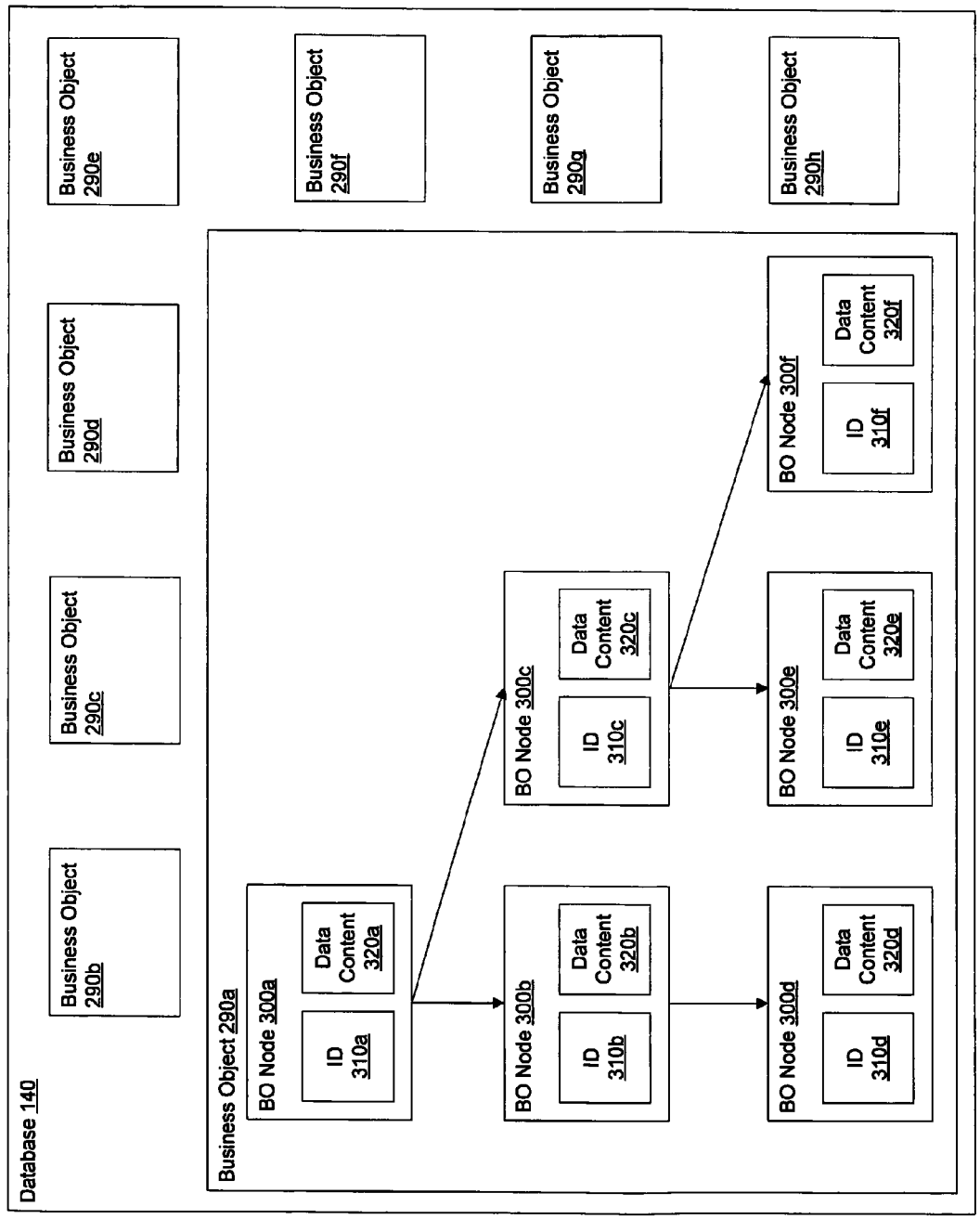
FIG. 2 is a block diagram illustrating an exemplary embodiment, consistent with certain aspects of the present invention, of a data structure of one of the business objects in a database.

FIG. 2 is a block diagram illustrating an exemplary embodiment of database 140 having business objects 290a-290h. One business object 290a of business objects 290a-290h is shown in additional detail to illustrate an example of the contents of business objects 290a-290h. Business object 290a comprises business object (BO) nodes 300a-300f that may be operated on by providers 130a-130f. For example, providers 130a-130f may create, modify, read, or delete BO nodes 300a-300f. Database 140 may be implemented with a computer-readable storage medium that is accessible by frameworks 110a-110c. The registration of the BO nodes 300a-300f in database 140 can provide a hierarchical list of BO nodes 300a-300f, although a simple list can be used instead. FIG. 2 is only illustrative since any suitable approach to operating on BO nodes 300a-300f may be used.

Each of BO nodes 300a-300f includes an identifier (ID) 310a-310f and data content 320a-320f. The ID 310a-310f of an individual one of BO nodes 300a-300f refers to an identifying technical key of that BO nodes, which uniquely identifies that BO nodes among BO nodes 300a-300f contained in database 140. The technical key can be used to, for example, access and read data content 320a-320f of that particular BO node. For example, ID 310a-310f of one of BO nodes 300a-300f may comprise a directory structure and filename associated with that BO node.

Instances of providers 130a-130f may be called to operate on BO nodes 300a-300f related to those particular instances of providers 130a-130f. For example, a set of modify transactions can modify BO nodes 300a-300f, such as the data content 320a-320f of BO nodes 300a-300f. These modify transactions can further include a "Create" procedure to create a new BO node, an "Update" procedure to update data content in one or more BO nodes, an "Action" procedure to change a state of a BO node, a "Delete" procedure to delete one or more BO nodes, and/or any other operation that can be performed on data content 320a-320f. One or more recall transactions, such as a "Retrieve" procedure that searches for a BO node based on its technical key, or a "Query" procedure using a wildcard search, can be used to search and/or retrieve data content 320a-320f from BO nodes 300a-300f. One example of a retrieve procedure is used to retrieve a saved historical image of one or more of BO nodes 300a-300f, which is a saved version of BO nodes 300a-300f in the state that BO nodes 300a-300f existed at a preceding time. Still further transactions may be provided to perform auxiliary tasks.

Figure 3:
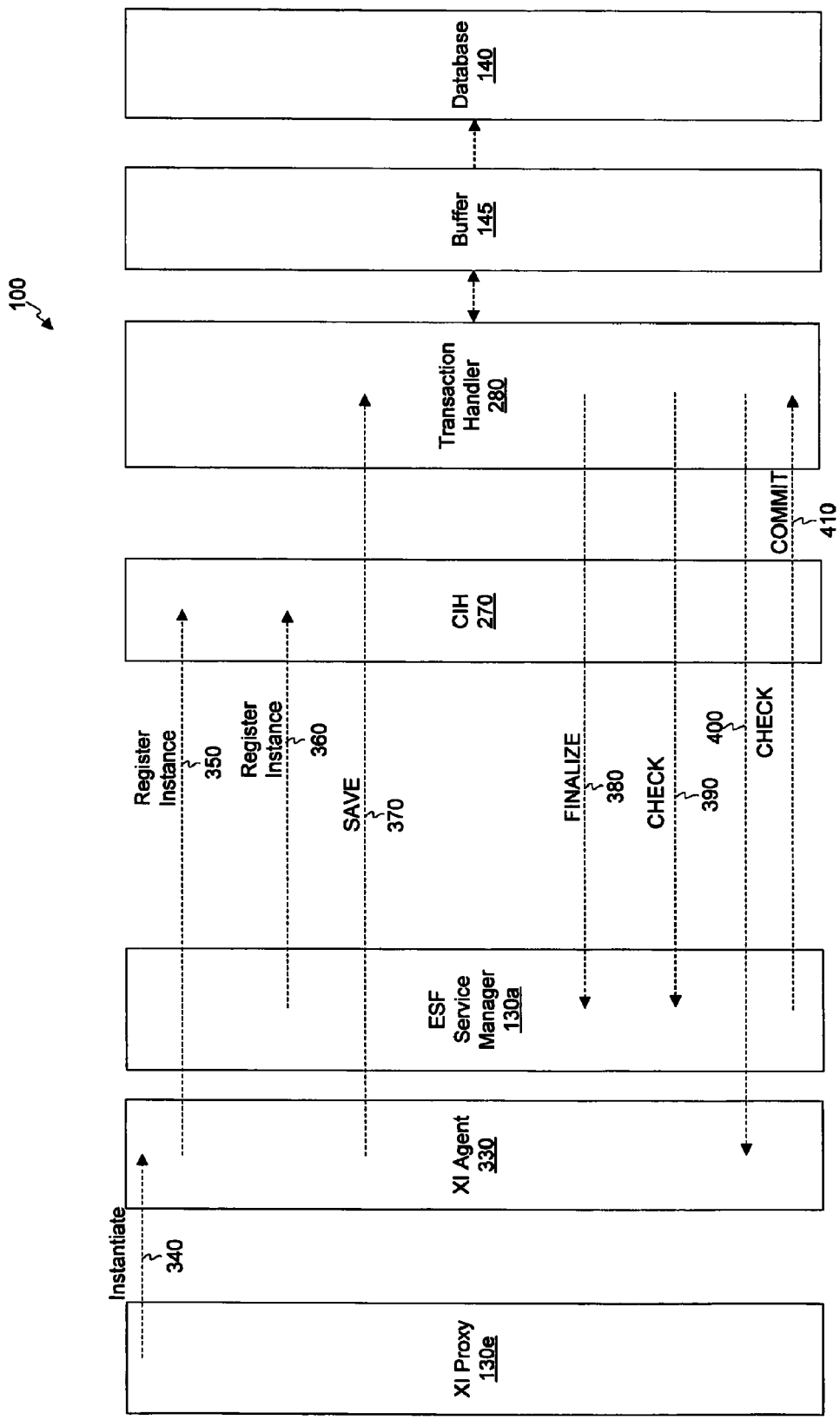
FIG. 3 is a block diagram illustrating a section, consistent with certain aspects of the present invention, of the system environment of FIG. 1, showing communications made between components of the system environment.

FIG. 3 is a block diagram illustrating a section of an exemplary embodiment of system environment 100 and communications made between components of system environment 100. This section of system environment 100 shows XI proxy 130b, an XI agent 330, service manager 130a, CIH 270, transaction handler 280, and database 140.

In the process shown in FIG. 3, one of providers 130a, 130e is instantiated for the first time to start a LUW. For example, a transaction may be called from the application of the XI framework, to operate on the BOs in database 140. XI proxy 130e is instantiated to create XI agent 330 (step 340), meaning that XI proxy 130e creates an instance of XI agent 330. XI agent 330 may be, for example, an agent responsible for adjustment of a number range, an agent corresponding to a Process Agent Framework (PAF), or an agent responsible for error handling in the XI framework. XI agent 330 registers at CIH 270 (step 350). CIH 270 may also instantiate transaction handler 280. CIH 270 may further instantiate service manager 130a. The instance of service manager 130a registers at CIH 270 (step 360).

To register providers 130a, 130e, CIH 270 may create references, such as reference numbers, at a location that is accessible by CIH 270. The references uniquely refer to the individual instances of registered providers 130a, 130e. Individual providers 130a, 130e may further be registered in relation to certain BOs that are related to providers 130a, 130e. Individual registered instances of providers 130a, 130e can thus receive reports from CIH 270 regarding transactions involving the BOs that are related to those individually registered instances of providers 130a, 130e.

In an exemplary embodiment, one or more of providers 130a, 130e register at CIH 270 in steps 350-360. A prerequisite for registering may be implementation of an operation referred to as IF_ESF_TRANSACTION_CALLBACK. For example, one or more of the proxies in the XI framework and the WS framework, such as XI proxy 130e, may generally be considered "foreign" providers that register at CIH 270 by calling the IF_ESF_TRANSACTION_CALLBACK operation. In the example shown in FIG. 3, XI proxy 130e may implement IF_ESF_TRANSACTION_CALLBACK and register at CIH 270.

Once the instances of providers 130a, 130e are registered at CIH 270, these provider instances can execute transactions, such as changes, that are intended for database 140. During the save operation, the providers of the ESF, such as provider 130a in this example, check buffer 145 to evaluate the integrity of the BOs related to the provider. If provider 130a reports an error, transaction handler 280 calls an operation referred to as On_Failed_Check on the foreign providers, such as provider 130e in this example, to ensure data integrity of the BOs related to those foreign providers.

There may be two main modes of executing transactions that make changes to database 140. One of providers 130a, 130e may be registered as "save owner" at CIH 270 at any given time such that the save owner (shown as XI agent 330) is eligible to actually start a transactional save phase. The save owner performs a "SAVE" operation (step 370) to execute transactions that are tentatively "suppressed" by CIH 270 by temporarily storing the changes in buffer 145. Suppressing these transactions keeps the transactions in a pending state in buffer 145 before changes can be written to database 140. CIH 270 suppresses these transactions until the LUW is terminated, at which time the pending transactions may actually be performed directly on database 140.

The SAVE operation may trigger processes by transaction handler 280 to guarantee that data consistency will result from the changes. For example, transaction handler 280 may call a "FINALIZE" operation (step 380) from ESF service manager 130*a*. In the FINALIZE operation, each of providers 130*a*, 130*e* can make changes to BOs that are related to that provider or another of providers 130*a*, 130*e*.

Transaction handler 280 may also call "CHECK" operations from providers 130*a*, 130*e* (steps 390 and 400) to request providers 130*a*, 130*e* to evaluate buffer 145 to determine whether an inconsistency results from the changes to the related BOs. The CHECK operations may include, for example, Check_Before_Save and Before_Save operations to be called from ESF service manager 130*a*, and an On_Check operation to be called at the foreign providers, such as XI proxy 130*e* or the WS proxy. In the Check_Before_Save operation, each of providers 130*a*, 130*e* can make changes to BOs that are related to that provider, but cannot make changes to BOs that are only related to another of providers 130*a*, 130*e*. In the Before_Save operation, changes cannot generally be made to the BOs, with exceptions such as for number range agents and/or status agents.

When transaction handler 280 calls the CHECK operations, such as Check_Before_Save and Before_Save, from service manager 130*a*, service manager 130*a* may then call corresponding operations at the service providers of the ESF.

However, transaction handler 280 may call the On_Check operation directly at the foreign providers such as XI proxy 130*e* or the WS proxy.

If at least one of registered providers 130*a*, 130*e* reports a data inconsistency, CIH 270 may perform error handling of buffer 145 by calling an error handling operation from one or more of providers 130*a*, 130*e*. For example, initiating the error handling may include transaction handler 280 calling an "On_failed_check" operation from XI proxy 130*e*. In addition, the occurrence of the data inconsistency may be recorded in a log of error information, such as a process integration persistence (PIP) database table used by the XI framework.

In one illustrative example, at least two BOs embody a purchase order. A first BO contains a header of the purchase order, and a second BO contains items of the purchase order. During the Check_Before_Save operation, a provider that is related to the first BO determines that the total number of items listed in the purchase order header does not correspond to the total number of items in the second BO. Thus, the providers related to the first and second BOs, respectively, modify the BOs to correct the inconsistency.

One of providers 130*a*, 130*e* may be registered as a "commit owner" at CIH 270 for any given LUW. If none of the foreign providers, such as XI proxy 130*e*, are registered as commit owner, ESF service manager 130*a* may take over this task. If the relevant providers did not report that an inconsistency resulted in buffer 145, the commit owner (shown as ESF Service Manager 130*a*) may call a "COMMIT" operation (step 410) to finally commit the pending changes to database 140 and terminate the LUW.

However, if a data inconsistency was detected in buffer 145, and the inconsistency cannot be remedied through error handling, then the commit owner may execute a "ROLLBACK" operation to reset buffer 145 to its state at a time preceding the commencement of the LUW. For example, before executing the ROLLBACK operation, an "On_Failed_Save" operation can be called on all of the foreign providers, such as XI proxy 130*e*, providing the foreign providers with the ability to persist error information in database 140 via a secondary database connection. For example, the occurrence of the data inconsistency may be recorded in a log of error information, such as the PIP database table of the XI framework.

After the transaction owner terminates the LUW, such as by performing one of the COMMIT or ROLLBACK operations described above, CIH 270 may execute a RESET operation to reset the related instances of providers 130*a*, 130*e* in relation to CIH 270. The instances of providers 130*a*, 130*e* may be terminated by CIH 270. Additionally, the instances of providers 130*a*, 130*e* associated with the LUW may be deregistered from CIH 270, such as by deleting the references associated with providers 130*a*, 130*e*.

In one version, system environment 100 is implemented such that CIH 270 works with a queued remote function call (qRFC) framework. Calls in the qRFC framework are typically serialized into a wait queue. Each of the queued transactions may have an associated queue name and queue counter that are used for management of the wait queue. For example, a provider that calls a transaction may define the queue name for that transaction. A transaction that is pending in the wait queue may be executed if it has no predecessor, as defined by the providers, in the wait queue. After a transaction is executed, the qRFC framework attempts to start the next pending transaction in the queue.

In an exemplary embodiment, a qRFC framework is used by an Enterprise Service Protocol (ESP). The ESP registers as the commit owner, thereby preventing other providers from performing a COMMIT or ROLLBACK operation. After the ESP has performed any necessary transactions and/or checks, the ESP passes control to the qRFC framework, which performs the COMMIT operation on its own. Thus, no additional COMMIT operation needs to be performed by the ESP.

In one embodiment, CIH 270 is implemented as a computer program product for managing the instances of the providers at the various frameworks. The computer program product comprises a computer-readable storage medium having computer-readable program code stored therein. The computer-readable program code is executable by a processor. Examples of computer-readable program code include, for example, machine code, such as produced by a compiler, and files containing a high level code that can be executed by the computer using an interpreter.

Figure 4:
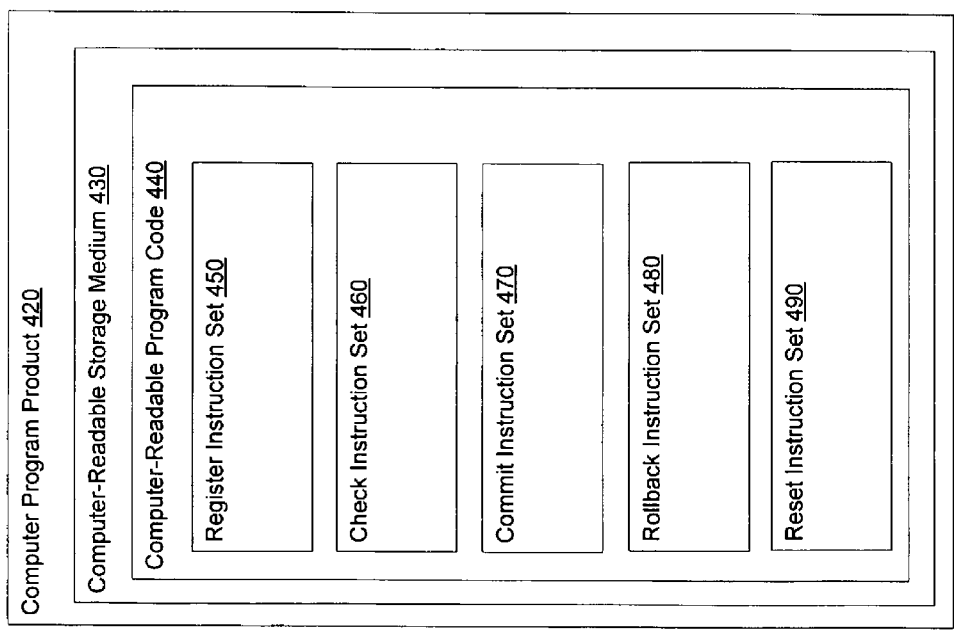
FIG. 4 is a block diagram of an exemplary embodiment, consistent with certain aspects of the present invention, of a computer program product including a computer-readable storage medium having computer-readable program code stored therein.

For purposes of illustration, FIG. 4 is a block diagram of an exemplary embodiment, consistent with the present invention, of a computer program product 420 including a computer-readable storage medium 430 that has computer-readable program code 440 stored therein. Computer-readable program code 440 may include a register instruction set 450 executable to register the providers. For example, register instruction set 450 may include the IF_ESF_TRANSACTION_CALLBACK operation described above. A check instruction set 460 may be executable to perform the CHECK operations described above. For example, check instruction set 460 may include the Check_Before_Save, Before_Save, and On_Check operations described above. In addition, a commit instruction set 470 may be provided that is executable to perform the COMMIT operation described above, and a rollback instruction set 480 that is executable to perform the ROLLBACK operation described above may also be provided. Computer-readable program code 440 may further have a reset instruction set 490 executable to perform the RESET operations described above to reset the registered providers in relation to the CIH.

Thus, the methods and systems described herein provide common handling of provider instances called from multiple different frameworks. This centralized handling can be advantageous to prevent interference between the multiple instances of the provider instances at runtime. Furthermore, data inconsistencies can be detected and managed in the buffer, such as to prevent data corruption or misreading of the database.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in other ways, using equivalents and alternatives that do not depart from the scope of the following claims.

The methods, systems, and computer program products disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus to perform the required methods and techniques.

What is claimed is:

1. A method comprising:
   registering a first instance of a first provider and a second instance of a second provider at a common instance handler that is implemented on one or more processors, the first provider comprising a first application that responds to one or more first requests from one or more client systems and the second provider comprising a second application that responds to one or more second requests from the one or more client systems;
   suppressing a first transaction from the first provider and a second transaction from the second provider, the first transaction operating on and causing a first change to at least one of a plurality of objects stored in a database, and the second transaction operating on and causing a second change to at least one of the plurality of objects stored in the database, the suppressing of the first transaction and the second transaction comprising temporarily storing the first change and the second change in a buffer without executing either of the first transaction or the second transaction or committing the first change or the second change to the plurality of objects stored in the database;
   calling a check operation from each of the first and the second providers, the check operation comprising the first and the second providers evaluating the buffer to determine whether committing the first and the second changes to the plurality of objects stored in the database will create any data inconsistencies in the database; and
   committing the first and the second changes to the database if the check operations from both of the first and the second providers determine that committing the first and the second changes to the plurality of objects stored in the database will not create any data inconsistencies in the database.

2. A method according to claim 1, further comprising initiating error handling of the buffer if either or both of the first provider and the second provider reports a data inconsistency.

3. A method according to claim 1, further comprising resetting the buffer to a state preceding the registration of the first instance of the first provider and the second instance of the second provider, the resetting occurring after the first and second changes are committed to the database.

4. A method according to claim 1, further comprising de-registering the first instance of the first provider and the second instance of the second provider, the de-registering occurring after the first and second changes are committed to the database.

5. A method according to claim 1, wherein the check operation from each of the first and the second service providers further comprises comparing data in a plurality of business objects that are related to either or both of the first and the second service providers to determine whether an inconsistency exists between the business objects.

6. A method according to claim 1, further comprising queuing the first transaction and the second transaction in a wait queue of a queued remote function call (qRFC) framework.

7. A method according to claim 1, further comprising instantiating the first provider before registering the instance of the first provider, and instantiating the second provider before registering the instance of the second provider.

8. A common instance handler for handling instances of providers in a plurality of frameworks, the common instance handler comprising:
   a processor; and
   a memory, wherein the processor and the memory are configured to perform a method comprising:
      registering a first instance of a first provider and a second instance of a second provider at a common instance handler that is implemented on one or more processors, the first provider comprising a first application that responds to one or more first requests from one or more client system systems and the second provider comprising a second application that responds to one or more second requests from the one or more client systems;
      suppressing a first transaction from the first provider and a second transaction from the second provider, the first transaction operating on and causing a first change to at least one of a plurality of objects stored in a database, and the second transaction operating on and causing a second change to at least one of the plurality of objects stored in the database, the suppressing of the first transaction and the second transaction comprising temporarily storing the first change and the second change in a buffer without executing either of the first transaction or the second transaction or committing the first change or the second change to the plurality of objects stored in the database;

calling a check operation from each of the first and the second providers, the check operation comprising the first and the second providers evaluating the buffer to determine whether committing the first and the second changes to the plurality of objects stored in the database will create any data inconsistencies in the database; and committing the first and the second changes to the database if the check operations from both of the first and the second providers determine that committing the first and the second changes to the plurality of objects stored in the database will not create any data inconsistencies in the database.

9. A common instance handler according to claim 8, wherein the method further comprises initiating error handling of the buffer if either or both of the first provider and the second provider reports a data inconsistency.

10. A common instance handler according to claim 8, wherein the method further comprises resetting the buffer to a state preceding the registration of the first and second provider instances, the resetting occurring after the first and second changes are committed to the database.

11. A common instance handler according to claim 8, wherein the method further comprises de-registering the first instance of the first provider and the second instance of the second provider, the de-registering occurring after the first and second changes are committed to the database.

12. A common instance handler according to claim 8, wherein the check operation from each of the first and the second service providers further comprises comparing data in a plurality of business objects that are related to either or both of the first and the second service providers to determine whether an inconsistency exists between the business objects.

13. A common instance handler according to claim 8, wherein the method further comprises queuing the first transaction and the second transaction in a wait queue of a queued remote function call (qRFC) framework.

14. A computer program product for handling instances of providers in a plurality of frameworks, the computer program product comprising a computer-readable storage medium having computer-readable program code stored therein, upon execution by one or more processors, the computer-readable program code causing the one or more processors to perform operations comprising:

registering a first instance of a first provider and a second instance of a second provider at a common instance handler that is implemented on one or more processors, the first provider comprising a first application that responds to one or more first requests from one or more client systems and the second provider comprising a second application that responds to one or more second requests from the one or more client systems;

suppressing a first transaction from the first provider and a second transaction from the second provider, the first transaction operating on and causing a first change to at least one of a plurality of objects stored in a database, and the second transaction operating on and causing a second change to at least one of the plurality of objects stored in the database, the suppressing of the first transaction and the second transaction comprising temporarily storing the first change and the second change in a buffer without executing either of the first transaction or the second transaction or committing the first change or the second change to the plurality of objects stored in the database;

calling a check operation from each of the first and the second providers, the check operation comprising the first and the second providers evaluating the buffer to determine whether committing the first and the second changes to the plurality of objects stored in the database will create any data inconsistencies in the database; and committing the first and the second changes to the database if the check operations from both of the first and the second providers determine that committing the first and the second changes to the plurality of objects stored in the database will not create any data inconsistencies in the database.

15. A computer program product according to claim 14, wherein the operations further comprise initiating error handling of the buffer if either or both of the first provider and the second provider reports a data inconsistency.

16. A computer program product according to claim 14, wherein the operations further comprise resetting the buffer to a state preceding the registration of the first instance of the first provider and the second instance of the second provider, the resetting occurring after the first and second changes are committed to the database.

17. A computer program product according to claim 14, wherein the operations further comprise de-registering the first instance of the first provider and the second instance of the second provider after the first and second changes are committed to the database.

18. A computer program product according to claim 14, wherein the operations further comprise comparing data in a plurality of business objects that are related to either or both of the first and the second service providers to determine whether an inconsistency exists between the business objects.

19. A method according to claim 1, further comprising receiving, at the common instance handler, the one or more first requests and the one or more second requests from the one or more clients.

20. A method according to claim 1, wherein the first provider is registered as a save owner by the common instance handler; the method further comprising:

calling, by the common instance handler, a finalize operation upon performance of a save operation by the save owner, the finalize operation causing each of the first provider and the second provider to make changes to make the first and the second changes, respectively; and calling, by the common instance handler, the check operation from each of the first and the second providers.

* * * * *